United States Patent [19]  [11] Patent Number: 4,868,432
Frandsen  [45] Date of Patent: Sep. 19, 1989

[54] MULTI-COIL ACTUATOR WITH END CAP FLUX CARRIER

[75] Inventor: Jorgen Frandsen, Winnipeg, Canada

[73] Assignee: Unisys Corporation (Formerly Burroughs Corp), Detroit, Mich.

[21] Appl. No.: 37,904

[22] Filed: Apr. 13, 1987

Related U.S. Application Data

[62] Division of Ser. No. 889,657, Jul. 25, 1986, Pat. No. 4,692,999.

[51] Int. Cl.⁴ ..................... H02K 41/025; H02K 1/04
[52] U.S. Cl. ....................................... 310/12; 310/14; 360/106
[58] Field of Search ..................... 310/12, 13, 15, 14; 360/97, 105, 106

[56] References Cited

U.S. PATENT DOCUMENTS

| | | | |
|---|---|---|---|
| 3,599,020 | 8/1971 | Harris | 310/13 |
| 4,208,685 | 6/1980 | Matla et al. | 360/107 |
| 4,494,022 | 1/1985 | Kawara et al. | 310/14 |
| 4,508,984 | 4/1985 | Guedj et al. | 310/14 |
| 4,587,466 | 5/1986 | Berg et al. | 310/13 |
| 4,669,013 | 5/1987 | Scranton et al. | 310/13 |
| 4,692,999 | 9/1987 | Frandsen | 310/13 |

FOREIGN PATENT DOCUMENTS 56-36391 9/1982 Japan ..................................... 310/13

Primary Examiner—Patrick R. Salce
Assistant Examiner—D. L. Rebsch
Attorney, Agent, or Firm—John J. McCormack

[57] ABSTRACT

A linear actuator for reciprocating a read/write head mechanism relative to a magnetic disk storage system, including a second, supplemental solenoid coil and associated magnet pole in addition to the usual arrangement, by way of improving linearity and efficiency. A low reluctance end cap connects the magnet poles to a central coke.

6 Claims, 5 Drawing Sheets

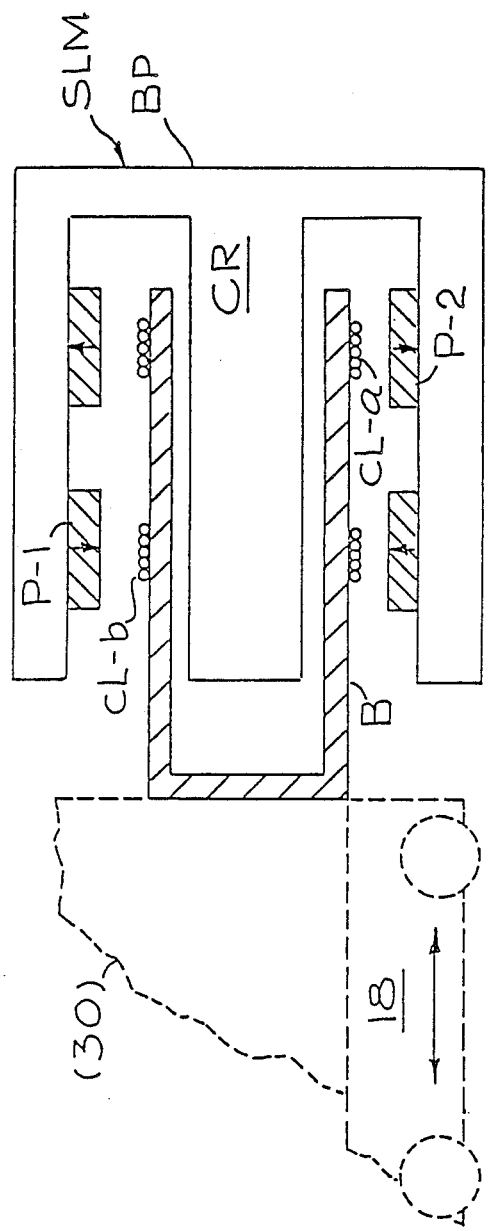
Fig. 4
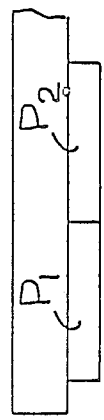
Fig. 4-A (FULL-FWD)
Fig. 4-B (FULL-RETRACT)

MULTI-COIL ACTUATOR WITH END CAP FLUX CARRIER

This is a division of application Ser. No. 889,687, filed July 25, 1986, now issued as U.S. Pat. N. 4,692,999. In addition the following of my cases may be of some interest: U.S. Pat. Nos. 4,314,295; 4,431,990; 4,318,145; and 4,612,592.

BACKGROUND, FEATURES OF INVENTION

This invention relates to electromagnetic actuator assemblies and in particular to novel improved linear voice-coil assemblies adapted for reciprocating magnetic transducer means relative to magnetic recording surfaces.

Workers know that computers today commonly employ magnetic disk files for recording and storing data. Disk files have the advantage of facilitating data transfer at randomly selected address locations (tracks) and without need for a "serial seek" as with magnetic tape. Such transducers must be reciprocated very rapidly between selected address locations (tracks) with high precision. This will be recognized as depending on how fast the system can move a transducer between locations and do so with high positional accuracy between closely-spaced track addresses. This constraint becomes very tricky as track density increases.

Disk file systems commonly mount a transducer head on an arm carried by a block that is supported by a carriage. This carriage is usually mounted on tracks for reciprocation by an associated transducer actuator. This invention is concerned with improving the efficiency of such actuators and particularly with improving linear "voice-coil" positioners.

Known Positioners

The actuators commonly used with magnetic disk files are subject to some exacting requirements; for instance, these systems typically involve a stack of several magnetic disks, each with many hundreds of concentric recording tracks spanning a radius of about 7 inches; and a head-carrying arm is typically provided to access each pair of opposing disk surfaces. This arm will typically carry two to ten heads, each to be reciprocated over a radial excursion of several inches to position its heads adjacent a selected track. Thus, it will be appreciated that such applications require a high positioning accuracy together with very fast translation to minimize access time—a significant portion of which is used for head positioning.

Disk heads must commonly be reciprocated very rapidly between selected address locations (tracks) with high precision. Thus it is critically important for an actuator system to move a transducer very rapidly between data locations and to do so with high positional accuracy between closely-spaced track addresses. This constraint becomes ever more burdensome as track density increases—as is presently the case.

That is, such a positioner must move its transducer heads very rapidly so that the associated computer can process data as fast as possible—computer time being so expensive that any significant delay over an extended period can inflate costs enormously. That is, the "transition time", during which heads are moved from track to track, is "dead time" insofar as data processing is concerned.

Now, the present trend is toward ever higher track density with increased storage capacity and decreased access time. Of course, as track density rises, closer control over the actuator mechanism is necessary to position transducer heads accurately over any selected track, lest signals be recorded, or read, with too much distortion, and without proper amplitude control, etc.

Thus, computer manufacturers typically set specifications that call for such inter-track movements within no more than a few milliseconds. Such high speed translation is most demanding on actuators, it postulates a powerful motor of relatively low mass (including carriage weight) and low translational friction. Another requirement for such head positioners is that they exhibit a relatively long stroke, (several inches) in order to minimize the number of heads required per disk.

The prior art disclosed many such positioner devices, including some intended for use in magnetic disk memory systems: e.g. see U.S. Pat. Nos. 3,135,880; 3,314,057; 3,619,673; 3,922,720; 4,001,889; 3,544,980; 3,646,536; 3,665,433; 3,666,977; 3,827,081; and 3,922,718 among others.

Voice Coil Motors:

Workers in the art are familiar with prior art magnetic actuators, especially those adapted for reciprocating magnetic transducers relative to magnetic disk surfaces or the like. Such an actuator is the well known voice coil motor VCM or moving coil actuator arrangement shown in FIGS. 1A and 1B. This structure will be recognized as comprising as E-shaped magnetic structure M including a central core $M_c$ along which a moving coil C is adapted to be movably mounted. Thus, working flux (see phantom magnetic flux line F) circulating through magnet M traverses the indicated gap $g_p$, between the pole pieces P and the core $M_c$, and is intercepted by coil C. When the coil is energized with a prescribed electric current and cuts a certain flux (prescribed flux density B and current i in coil C of length L) yields certain force F ($F = BLI$), it will be induced to move as indicated by the arrow. The direction of motion will depend on the polarity of the current relative to the flux, as known in the art.

The voice coil motor (VCM) comprises a solenoid like those used to drive an audio speaker. In disk drives, magnetic read/write heads are commonly carried by a carriage driven by a VC motor including a mobile electric coil positioned in a magnetic field and fed by a current of selected intensity and polarity. This magnetic field is typically established by permanent magnetic means disposed about the movable coil.

Such a VC linear positioner can exhibit certain disadvantages—for example: undesirably large mass and associated excess power requirements; and drive and control circuitry which is unduly-complicated. That is, such actuators typically involve a relatively heavy carriage; accordingly a lot of inertia must be overcome each time the carriage is accelerated from rest. This acceleration must be maximized to minimize access time. Thus, a great burden is placed upon the power requirements to the voice coil to provide the necessary high acceleration. Such VC actuators are not particularly efficient in converting electrical power either; also they typically require relatively complicated drive and control circuitry to effect the requisite precise positioning despite high acceleration. Further, a VC motor is not sufficiently "linear", i.e., its coil impedance commonly varies with position and thus its force/excursion curve is relatively non-linear. This invention is intended to improve the efficiency and performance of such VC positioners, making them more linear in a dual coil array.

FIG. 1 represents a conventional moving coil magnetic actuator (VCM) very schematically shown (see also Fujitsu Scientific and Technical Journal June 1972, page 60 and following). Here a moving coil (armature) C will be understood as mounted upon a movable bobbin adapted to reciprocate along the core portion $M_c$ of an E-shaped magnetic circuit M, the circuit also including opposing poles P connected by yoke section Y. Such reciprocation will be responsive to electric current through coil C as is well known in the art.

Here the permanent magnetic source of magnetic flux will be recognized as a cylindrical, or semi-cylindrical, shell P with its inner core $M_c$ to be encircled by the moving solenoid coil C. Coil C will be recognized as conventionally translated along core $M_c$ when energized with current (due to inductive interaction with the magnetic flux—see arrows emanating between core $M_c$ and peripheral magnetic parts). Force arrows $T_F$, $T_R$ indicate the resultant reciprocal translation forces so developed (forward, reverse)—the force direction being determined by direction of current through coil C, as well known in the art.

The magnetic flux field set-up by coil current will flow mainly through the "path of least reluctance" (as indicated by flux loops F through the magnetic).

Workers are aware that, since the flux return path traverses the cross-section of core $M_c$, then in certain instances actuator efficiency and the upper limit of operation will be affected by "flux saturation" at this relatively narrow section—whereby an increment in coil current fails to produce a proportionate significant increase in actuator force. One might even say that such incremental current and flux is wasted. Flux may also be deemed wasted insofar as the flux return path traverses yoke portion Y (an "open loop" flux) rather than moving through the "working gap" between coil C and (the inner facing surfaces of ) poles P (in a "closed-loop").

In accordance with one salient aspect of the present invention, such a transducer positioner is formed to include a second moving coil. According to this feature, this second moving coil (and associated magnet means) is intended to provide a low leakage "balanced" flux path, one which is more efficient than the prior art ("single coil/single magnet" configurations, which tend to describe a conventional "unbalanced", high leakage flux path). That is, this second coil is provided, along with a companion pole piece, and is so-wound and so-excited as to complete the overall flux gap in a "closed loop" mode. Such "dual coil" actuators advantageously use the second coil, etc., as a "working return" for flux, also this facilitates reducing the magnet mass needed and enhance efficiency.

Workers in the art will be given to understand that such a "closed loop", "balanced" flux path is considerably more efficient than prior art "unbalanced" flux modes, especially as regards leakage; a "balanced" flux also tends to improve "linearity" (i.e., make coil impedance more constant as a function of coil position, giving a more linear force/distance curve for the overall device). Such an improved actuator assembly will be seen as better balanced magnetically and, because of its inherently improved linearity, will no longer critically depend upon magnet thickness (except for achieving a higher flux).

As seen hereafter, it will be readily apparent to workers how such a dual-coil armature provides a moving coil structure of improved linearity. Such an improved armature will be seen to give superior performance, e.g., as a disk head positioner with "balanced" flux as compared with the conventional VC positioner.

In accordance with another salient feature, such dual coil positioners are taught in operative combination with a disk drive arrangement.

Thus, one object of this invention is to provide the mentioned and other features and advantages. Another object is to teach the use of such dual coil VC actuators in transducer assemblies, especially as adapted for positioning heads in a disk drive. Another object is to provide head actuators for disk drives exhibiting better linearity and yet a further object is to teach the advantageous use of such transducer actuators in disk drive assemblies.

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIG. 4 shows, in section, a like carriage-actuator embodiment modified according to the invention; with magnet coil portions thereof shown in the schematic fragmentary perspective of FIG. 3 and FIG. 5; while FIGS. 4A, 4B show the coils in "FORWARD" and "REVERSE" position.

DESCRIPTION OF THE PREFERRED EMBODIMENT

Figure 2:
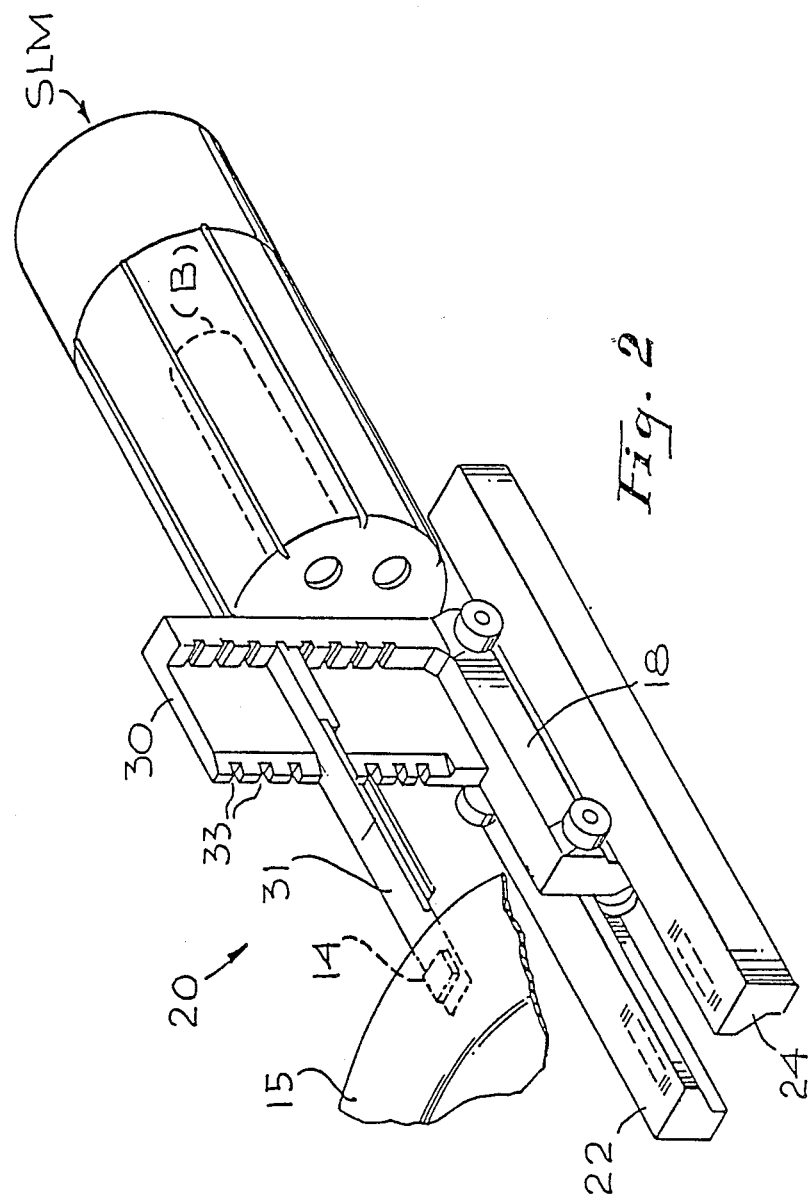
FIG. 2 depicts, in fragmentary perspective, a multihead carriage for use with such an actuator.

FIG. 2 discloses, in a very simplified functional perspective view, portions of a transducer linear actuator assembly 20 especially adapted for a disk drive. Here and elsewhere, it will be understood that all elements are conventionally constructed and operated except as otherwise specified. It will be understood that a magnetic recording disk 15 is provided as part of a magnetic disk pack (not shown), together with a carriage assembly 18 adapted to support and to controllably reciprocate read/write heads on support arms, translating them across recording portions of the disks for the reading and writing of information impressions thereon as well known in the art. Here, only head 14 on arm 31 (for disk 15) is shown.

Workers will recognize that actuation of the carriage assembly 18 may be conventionally provided by a linear motor comprised essentially of a stationary magnetic core SLM and a movable coil assembly, or bobbin B. Bobbin B is mounted from carriage 18 and arranged so that, with proper energization of its coil (through electrical leads, not shown), carriage 18 can be induced to move toward and away from the magnet core, reciprocating along the ways 22, 24. This motion will be understood as controllably scanning the head assemblies across the disk recording surface, etc., as well known in the art.

The fixed parallel ways, or rails, 22, 24 support the carriage for such reciprocation and carry a support structure 30 in which are provided a plurality of slots 33 and associated mounting means. Each slot accommodating a respective head support—one for each inter-disk gap (only one arm 31 indicated here, with associated head assembly 14, for simplicity's sake).

Figure 1A:
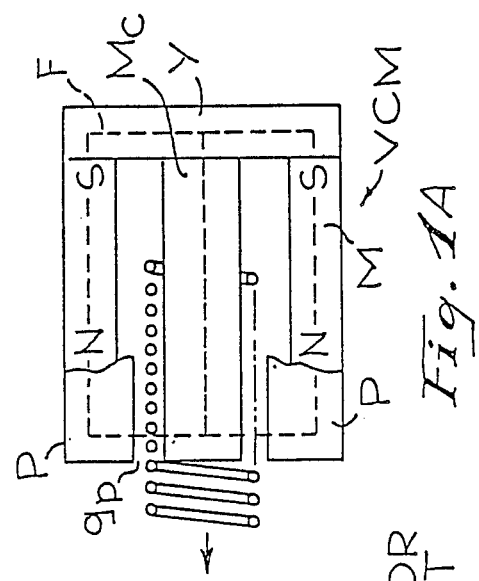
FIG. 1A depicts a prior art voice coil actuator in array schematic, partly-sectional side view, with selected portions thereof shown in the fragmentary perspective of FIG. 1B.
Figure 1B:
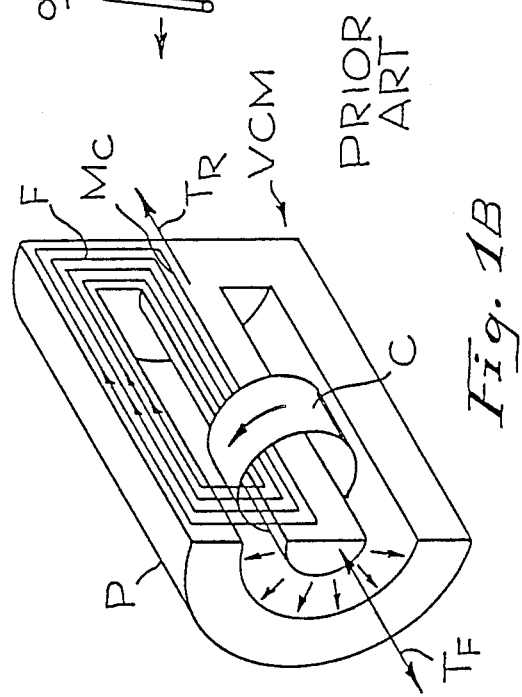

Construction and operation of such linear motors is well known and is summarized relative to FIGS. 1A, 1B above.

Such translation of carriage 18 will, of course, shift the read/write head assembly 14 along the recording surfaces of rotating disk 15 to precisely position it at any of the various concentric data tracks thereon. The accuracy of head positioning will depend on the accuracy with which carriage 18 is translated. The present invention is directed towards improving linear motors driving such carriage assemblies.

Figure 3:
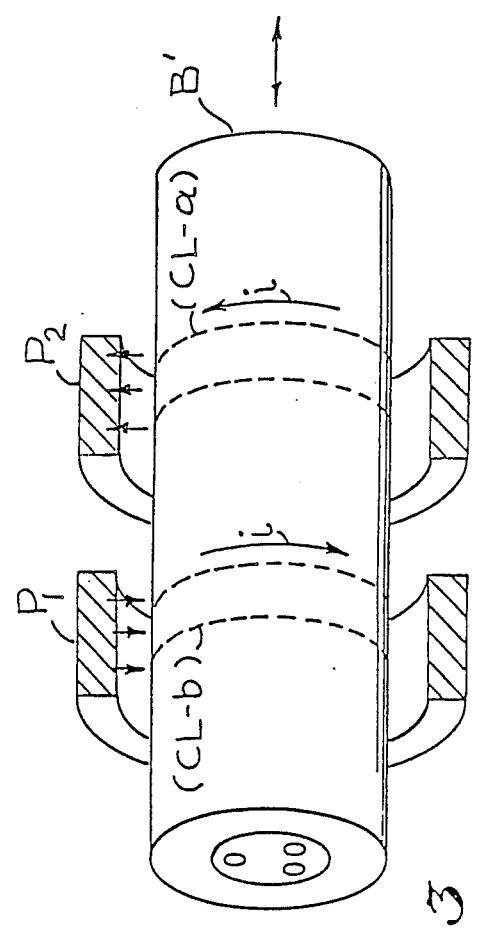
Figure 6:
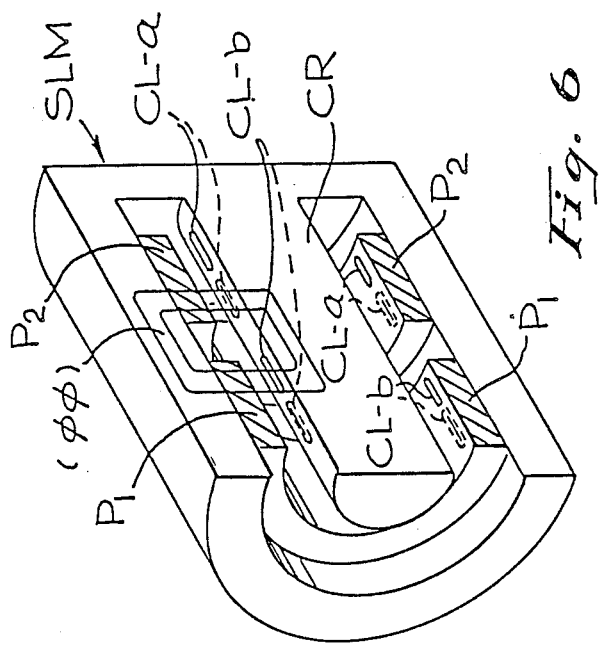
FIG. 6 shows these portions partly sectioned.

FIGS. 3-6 will be understood as indicating various views of certain portions of a voice coil motor embodiment improved according to the invention and including a supplemental coil and associated magnetic means according to the invention. More particularly, FIG. 4 shows, in simplified side sectional view, carriage 18 and the bobbin B plus the head mount structure 30 carried thereby (the latter indicated in phantom and fragmentarily). Bobbin B is relatively conventional and serves to mount a pair of solenoid coils CL-a, CL-b (outside the distal end thereof), these coils being of relative conventional construction and operation as known in the art. FIG. 3 also shows poles P-1, P-2 and coils CL-a, CL-b on bobbin B.

Shown in operative inductive relation with coils cL, is the magnetic support structure SLM, including a central core portion CR disposed to be surrounded by the coils cL and to define the path along which they are reciprocated by carriage 18. SLM also includes a pair of outboard arms mounting the permanent annular magnets P-1, P-2, and a narrow backplate BP. Plate BP may preferably be made unusually narrow (light) since relatively little magnet flux need be passed thereby according to such a "dual coil" design. Each magnet P is arranged and positioned to be in potential flux-cutting relation with a respective coil cL. FIGS. 4A and 4B illustrate the full-retract (or Reverse) and full-extended (or Forward) positions respectively of coils cL, with a schematic indication of the "balanced" ("closed") flux flow therewith. Coil CL-b thus is swept across pole P-1, and its current polarity selected accordingly; likewise for coil CL-a to be swept across pole P-2.

Figure 5:
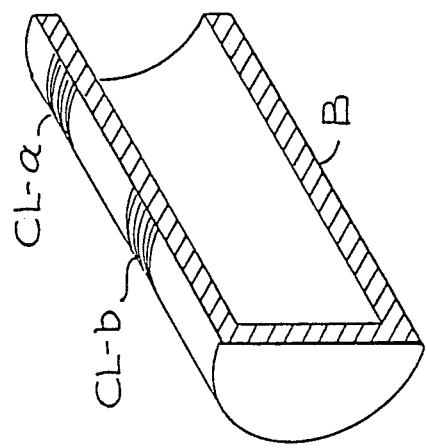

A fragmentary perspective of the coil-supporting end of bobbin B, with segments of coils cL wound thereon, is shown in FIG. 5.

According to a related feature, coils cL will be understood as arranged to be oppositely energized and magnets P to be likewise oppositely-poled, thus balancing flux flow symmetrically and allowing "return flux" to be put to work.

The support sections of magnet structure SLM may comprise any suitable magnetic (low reluctance) magnet material, while the permanent magnet sections P-1, P-2, preferably comprise annular ceramic ferromagnets or the like of suitable strength. The dimensions of magnets P, their materials and the coil' length, number of turns, current, etc., will be a matter of choice, as well known in the art. However, according to a feature of advantage, the thickness of magnets P and of backplate BP may now be ignored, essentially, except where increased flux is to be provided—thus advantageously reducing the necessary thickness and weight of magnets and reducing the weight, cost, etc., of the overall structure and rendering it somewhat more compact. Directing return flux from one magnet/coil unit through the second magnet/coil unit will obviously divert it from backplate BP.

FIG. 6A shows a fragmentary somewhat simplified perspective view of magnet structure SLM, with a section of magnets P and associated coils cL indicated only diagrammatically and for purposes of illustrating operational characteristics. Here coils cL are depicted in "REVERSE", or full-retracted position (full-line coils) as in FIG. 4B; while the opposite "FORWARD", or full-advanced position is indicated in dottedline fashion (as in FIG. 4A).

Results

Workers in the art will recognize that such improved dual coil actuators with a balanced (closed loop) flux configuration are considerably more efficient than prior art unbalanced (open loop) structures, with little or none of the leakage inherent therein. Dual coil actuators also exhibit superior, more constant coil impedance as a function of coil position and a surprisingly more linear Force/Displacement characteristic. Thus, such an actuator assembly will be viewed by workers as better balanced and because of its inherently improved linearity and more efficient flux-use, the thickness and mass of its magnets may be considerably reduced without sacrificing performance.

Variations

Figure 7:
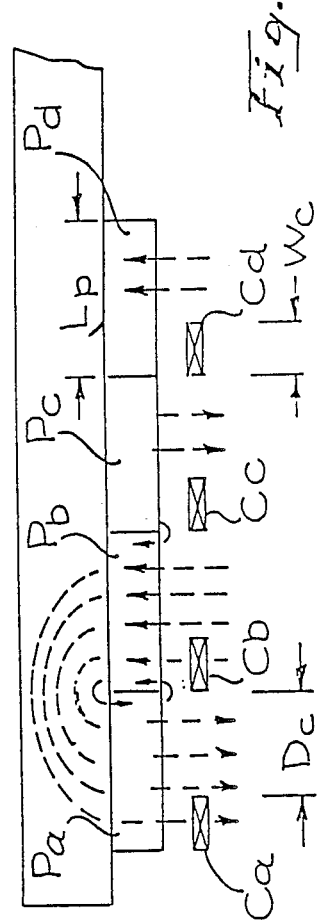
FIG. 7 depicts an alternate embodiment after the manner of FIG. 4A.

Workers will recognize that such a dual coil actuator design may be modified in various ways within the spirit of the overall concept. Thus, the working length of the actuator may, in certain cases, be extended to include two or more pairs of opposite-polarity coils (e.g., $c_a$, $c_b$, $c_c$ and $c_d$ in FIG. 7), each coil operatively associated with a respective magnet of matching polarity (e.g., poles $P_a$, $P_b$, $P_c$, $P_d$) suspended from low-reluctance return CAP in FIG. 7, each coil shown in "FORWARD" position as in FIG. 4A and assumed mounted on a reciprocating bobbin with current input means, etc., none shown here). The resultant magnetic flux is indicated in dotted line fashion. It will be recognized that for optimized flux use the magnet poles are placed in abutment, and fashioned so that their length ($L_p$) approximates the sum of the inter-coil separation ($D_c$) and coil width ($w_c$): $L_p = D_c + w_c$.

Conclusion

Workers will appreciate how aptly such dual coil (paired coil) actuators are combined to drive transducer assemblies for disk drive apparatus and the like. In particular it will be appreciated that such actuators can be used to improve the efficiency, power and the cost effectiveness of a transducer actuator and to increase its speed (acceleration) accordingly—something workers in the are will applaud. Workers will also appreciate that such actuators may be used to reciprocate other similar loads in related environments.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to positioning other transducers and related loads in similar systems and environments. For instance, related embodiments may be employed to position transducers for other forms of recording/reproduced systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. An improved voice coil motor comprising a first coil means mounted on a bobbin to reciprocate along a prescribed path; low-reluctance core means disposed along this path centrally of said bobbin; associated first magnet means including first pole means disposed operatively adjacent the coil; plus a second coil means and a second associated magnetic means presenting second pole means, said second pole means having a polarity opposite to that of said first coil means and said first pole means; and low-reluctance flux return means, including a low-reluctance, flux-carrying end cap directly connecting both said pole means and said core means.

2. A multi-coil linear electromagnetic actuator including:
   low-reluctance core means extending along a prescribed path;
   a plurality of magnet means disposed along this path and arranged to each include respective first and second opposed magnetic pole means, disposed and arranged so a bobbin structure can pass operatively adjacent thereto as it proceeds along said path, past the pole means, with the pole means presenting magnetic flux which intercepts and is electromagnetically interactive with the bobbin structure; said pole means being opposed in magnetic polarity to one another, and separated a constant spacing d from adjacent like-polarity pole means;
   a plurality of coil means mounted on said bobbin structure so as to magnetically interact with said flux as each coil means passes each first and second pole means whereby a prescribed electrical current may be induced in a coil means to drive said bobbin structure along said path; and
   low-reluctance flux return means, including a low-reluctance, flux-carrying end cap directly connecting said core means and said magnet means.

3. A linear electromagnetic actuator including:
   a support structure arranged so as to be reciprocatable along a prescribed path;
   low-reluctance core means disposed along this path; a plurality of magnet means disposed along this path about said core means and arranged to each include respective first and second opposed magnetic pole means of opposite polarity these pole means being disposed and arranged so a bobbin structure can pass operatively adjacent thereto as it proceeds along said path, whereupon the pole means will then present intercepting magnetic flux which is electromagnetically interactive with the bobbin structure;
   a plurality of spaced coil means along said bobbin structure so each will magnetically interact with said flux as it passes a respective magnet means whereby to generate a prescribed inductive force driving said bobbin structure along said path; and
   low-reluctance flux return means, including a low-reluctance, flux-carrying end cap directly connecting said core means and said magnet means.

4. The combination as recited in claim 1, wherein the mass of said magnet means is minimized in accordance with redistribution of flux resultant.

5. The combination as recited in claim 4 wherein said magnet means includes backplate means, the mass of said backplate means being minimized.

6. The combination as recited in claim 1 as adapted for head positioning in a disk drive arrangement.

* * * * *